Dec. 28, 1926.　　　　　　　　　　　　　　　1,612,608
G. L. CHAMBERLIN
ANIMAL TRAP
Filed Sept. 11, 1922　　　2 Sheets-Sheet 1

George L. Chamberlin.

By Langdon Moore, Attorney

Dec. 28, 1926.
G. L. CHAMBERLIN
1,612,608
ANIMAL TRAP
Filed Sept. 11, 1922    2 Sheets-Sheet 2
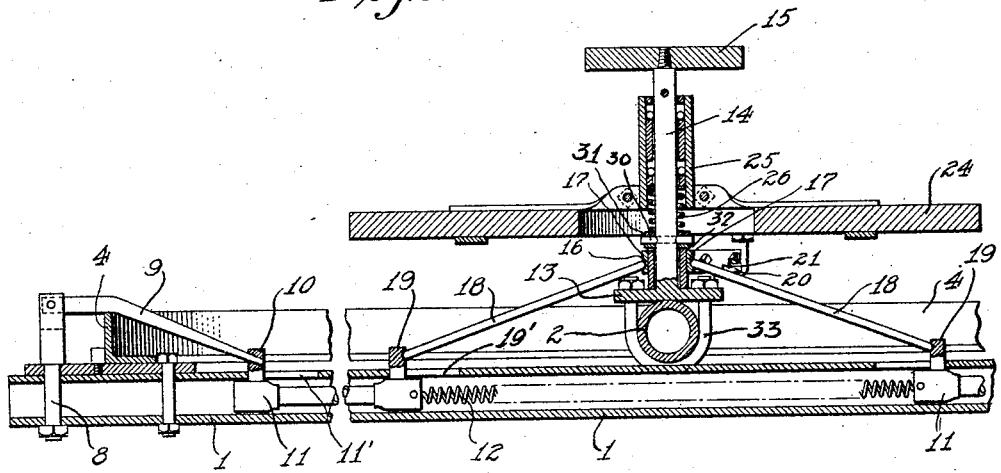
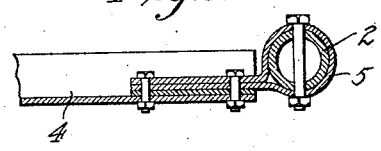
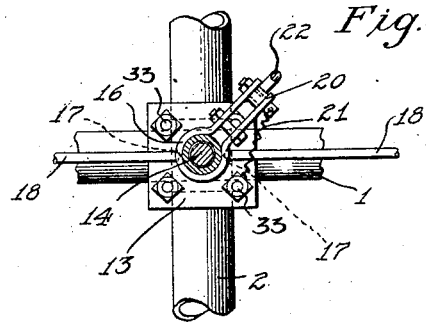
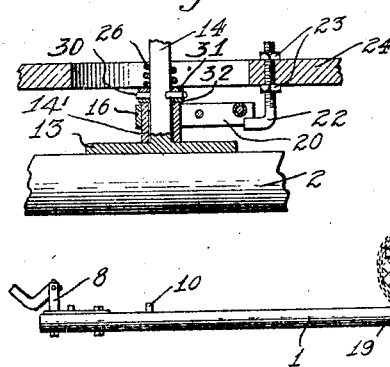
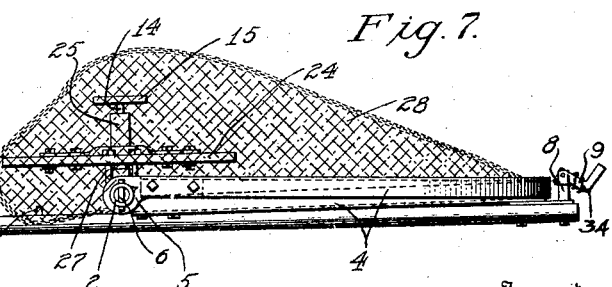
Inventor:-
George L. Chamberlin.
By Langdon Moore, Attorney Patented Dec. 28, 1926.

1,612,608

UNITED STATES PATENT OFFICE.

GEORGE L. CHAMBERLIN, OF WICHITA, KANSAS.

ANIMAL TRAP.

Application filed September 11, 1922. Serial No. 587,619.

This invention comprises an animal trap. It is contemplated among the objects to provide a device of this character which will catch animals alive, which may be used with equal facility in water or on land; which will be strong, quick and positive in its action, the bait being so placed that all of the animal can be brought within the outer edges of the trap before it is sprung, thus avoiding injury to the animal; which can be made from simple, available material, and which will, in a word, constitute a practical and successful device for this purpose.

Other objects and advantages will in part be apparent and in part be brought out more fully in the description which follows.

An embodiment of the invention is illustrated in the accompanying drawings, the following views being shown:

Fig. 3 is an enlarged fragmentary detail view, partly broken away, and taken on line 3—3 of Fig. 1;

Figs. 4, 5 and 6, are fragmentary detail views of working parts of the device; and Fig. 7 is a view in side elevation showing the trap in closed or sprung position.

Figure 1:
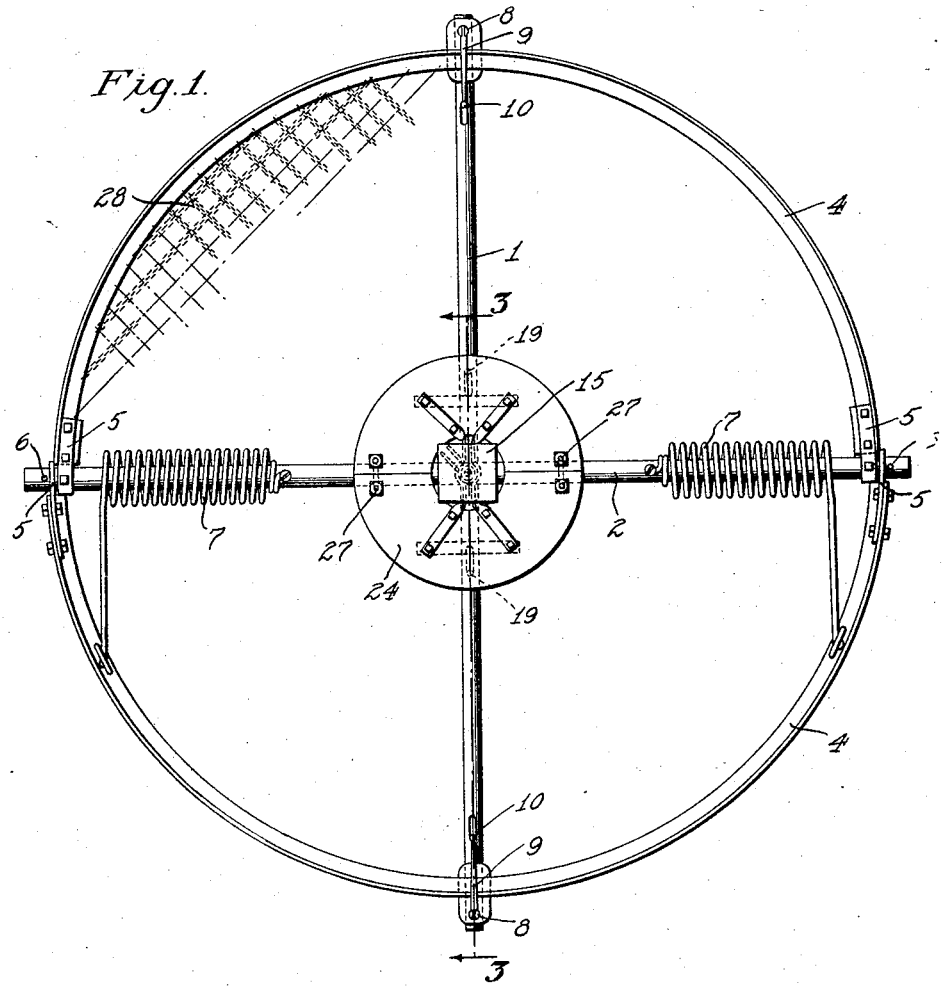
Figure 1 is a view in top plan of a trap embodying my invention and shown in open or set position.

In these views, 1 and 2 are crossed bars or tubing, which may be connected centrally but which are preferably loosely arranged one on the other and constitute a frame. The bar 2 is placed above the other frame piece and has hingedly secured to its ends, jaws 4. These are in semi-circular form, and have swinging movement on the ends of bar 2, through hinges 5, and are retained on the bar suitably as by pins 6 passing through the bar. Coil springs 7 of great power are secured, at one end to bar 2, and at the other end to one of the jaws, the tendency of these springs being to close the jaws and maintain them in closed position.

The hinges 5 are in the form of loops or eyes encircling bar 2, and secured at their ends to the ends of the semi-circular jaws. There is, preferably, a spring for each jaw, one end of the spring being secured to bar 2, and the opposite end to its respective jaw.

Figure 2:
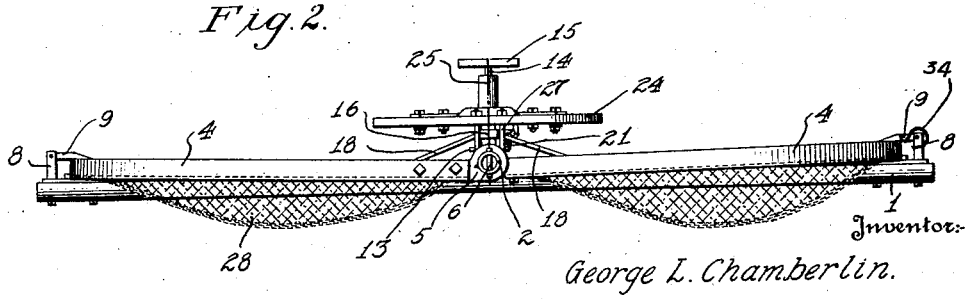
Fig. 2 is a view in front elevation of the same.

Means are provided for holding these jaws in open or set position and as here shown include upstanding pivot members 8, which are bolted through bar 1 and constitute supports for latch members 9 which are pivotally mounted, at their ends, on the supports and adapted to be swung inwardly over the edges of the jaws to hold them in the position shown in Figs. 1, 2 and 3. The free ends of these latch members are, when the trap is in set position, held in keepers 10, carried by sliding bolts 11, mounted for movement within the bar or tubing 1, the keepers passing through slots 11' formed in the tube. Means are provided for normally tending to pull the sliding bolts together to spring the trap and as here shown comprises a spring 12 housed within the tubing 1 and secured to corresponding ends of the sliding bolts.

Mounted on bar 2, and secured by means of two U-shaped clamps 33, is a plate 13, carrying an upwardly-extending standard or support 14. Surrounding the lower end of the standard 14 is a rotatable sleeve 14' which acts as a bearing member for collar 16, presently to be described. The clamps 33 pass under bar 2 and through plate 13 and rigidly hold said plate in position on bar 2. The standard carries, at its upper end, a bait-table 15 and, at its lower end there is a collar 16, loosely encircling the standard and provided with notches, 17, oppositely disposed and normally placed in alignment with the sliding bolts in bar 1, beneath. When the trap is set, rods 18 are placed with one end of each rod in one of the notches in collar 16, and the opposite end of each rod is placed in a notch in an upstanding keeper 19 on the inner side of each bolt and adapted to have sliding movement in slots 19' provided in bar 1, thus resisting the tendency of the bolts to come together and release the jaws.

Means are provided for throwing the rods off centre to release the trigger mechanism and close the trap and this is effected by the animal in attempting to get the bait. As here shown there is provided on the collar 16 an extending arm 20. To one end of this arm there is attached a spring 21, the other end of this spring being secured to a fixed portion of the device, such as plate 13. The spring tends to swing the arm and thus place notches 17 out of alignment with sliding bolts 11. When the trap is set, this tendency of the spring is prevented by a depending stop 22, the engagement of which with a portion of arm 20 is adjustably arranged as by bolts 23. This stop is carried by a platform 24 mounted on a slidable bearing collar 25, mounted on standard 14 and normally held in upper position by a spring 26 encircling the standard and forcing the collar and platform to the limit of their movement in one direction. Passing through the standard 14 is a pin 30, having washers 31 and 32 positioned on either side thereof for the purpose of supporting the lower portion of the spring 26 and preventing the collar 16 from moving upwardly. Guides 27 carried by the platform and loosely engaging one of the frame pieces, insure vertical movement of the platform. An encircling chain or mesh 28 is loosely disposed around the jaws, which are preferably of angle iron so that when the trap is sprung, as shown in Fig. 7, the animal will be confined between the mesh and jaws.

The operation will be apparent. When the trap is set as shown in Fig. 1, pressure on platform 24 by an animal attempting to obtain the bait, will depress the platform. This releases stop 22 from the end of arm 20, permitting collar 16 to be swung in a clockwise direction as seen in Fig. 4. This swinging movement throws rods 18 out of alignment releasing sliding bolts 11 which in turn release latches 9. These permit the jaws to come together under the powerful influence of the coil springs and securely enclose the animal within the mesh. This operation of the parts permits the jaws 4 to come together under the powerful influence of the coil springs 7 and securely enclose the animal within the mesh. Attached to latch 9 and pivot member 8, on the section 4 which is normally stationary, is the spring 34. When the trap is sprung, spring 34 throws the latch 9 upward and outward so that the movable member 4 may lie flat, as illustrated in Fig. 7 of the drawings.

While the invention has been described with considerable detail in connection with the present embodiment, it will be understood that I do not wish to limit myself to the precise form of this disclosure as many changes in the construction and arrangement of the parts are believed to be within the scope of the invention as set forth in the claims.

What I claim is:

1. An animal trap comprising crossed members constituting a frame; jaw members hingedly mounted for swinging movement on the frame; means normally tending to force the jaws together; a latch mechanism adapted to hold the jaws in open position; sliding members associated with the latch mechanism to hold the latch mechanism against action when the trap is set; a movable platform adapted to be actuated by an animal; and a connection between the platform and sliding members whereby actuation of the platform will release the sliding members and latch mechanism; said platform including a standard; a collar slidably mounted thereon; a second collar; an arm on one of the collars; a spring normally tending to swing the arm; and a stop on the platform adapted to hold the arm against the action of the spring.

2. An animal trap comprising crossed members constituting a frame; jaw members hingedly mounted for swinging movement on the frame; means normally tending to force the jaws together; a latch mechanism adapted to hold the jaws in open position; sliding members associated with the latch mechanism to hold the latch mechanism against action when the trap is set; a movable platform adapted to be actuated by an animal; a connection between the platform and sliding members whereby actuation of the platform will release the sliding members and latch mechanism, said platform including a standard; a collar slidably mounted thereon; a second collar; an arm on one of the collars; a spring normally tending to swing the arm; a stop on the platform adapted to hold the arm against the action of the spring; and guide members associated with the platform and frame for guiding the movement of the platform.

3. An animal trap comprising crossed members constituting a frame; jaw members hingedly mounted for swinging movement on the frame; means normally tending to force the jaws together; a latch mechanism adapted to hold the jaws in open position; sliding members associated with the latch mechanism to hold the latch mechanism against action when the trap is set; a movable platform adapted to be actuated by an animal; a movable collar connected with the platform; a connection between the platform and sliding members whereby actuation of the platform will release the sliding members and latch mechanism, said connection including keepers associated with the sliding members; and a rod adapted to be in contact at one end with certain of the keepers and at the other end associated with the movable collar.

4. An animal trap comprising a tubular bar provided with slotted openings at opposite ends of the bar; a sliding member mounted for movement within the bar; a latch engaging portion of each sliding member extending outwardly through one of the slots in the bar; a latch adapted to cooperate therewith; a keeper connected with each sliding member and extending outwardly through one of the slots in the bar; a cross bar associated with the tubular bar and constituting therewith, a frame; jaw members hingedly mounted on the cross bar; a spring member operatively connected with the jaws and normally tending to force them together into closed position; a movable platform mounted on one of the bars; a sliding collar connected therewith; a swinging sleeve mounted on one of the bars in the path of travel of the collar; a spring normally tending to swing the sleeve in one direction; a stop restraining this movement when the trap is set; and a member connecting the swinging sleeve and the keeper on each sliding member when the trap is set.

5. An animal trap comprising a tubular bar provided with slotted openings at opposite ends of the bar; a sliding member mounted for movement within the bar; a latch engaging portion of each sliding member extending outwardly through one of the slots in the bar; a latch adapted to cooperate therewith; a keeper connected with each sliding member and extending outwardly through one of the slots in the bar; a cross bar associated with the tubular bar and constituting therewith, a frame; jaw members hingedly mounted on the cross bar; a spring member operatively connected with the jaws and normally tending to force them together into closed position; a movable platform mounted on one of the bars; a sliding collar connected therewith; a swinging sleeve mounted on one of the bars in the path of travel of the collar; a spring normally tending to swing the sleeve in one direction; a stop restraining this movement when the trap is set; and a spring normally tending to pull the sliding members together.

6. An animal trap comprising a tubular bar provided with slotted openings at opposite ends of the bar; a sliding member mounted for movement within the bar; a latch engaging portion of each sliding member extending outwardly through one of the slots in the bar; a latch adapted to cooperate therewith; a keeper connected with each sliding member and extending outwardly through one of the slots in the bar; a cross bar associated with the tubular bar and constituting therewith, a frame; jaw members hingedly mounted on the cross bar; a spring member operatively connected with the jaws and normally tending to force them together into closed position; a movable platform mounted on one of the bars; a sliding collar connected therewith; a swinging sleeve mounted on one of the bars in the path of travel of the collar; a spring normally tending to swing the sleeve in one direction; a stop restraining this movement when the trap is set; a member connecting the swinging sleeve and the keeper on each sliding member when the trap is set; a spring tending to pull the sliding members together; said latches being adapted to cross the jaws when in open position and be retained by the keepers on the sliding members; and members disposed between the swinging sleeve and each keeper and resisting the tendency of the spring to draw the slidiing members together when the trap is set.

In testimony whereof I affix my signature.

GEORGE L. CHAMBERLIN.